(12) United States Patent
Bedord et al.

(10) Patent No.: US 11,821,495 B2
(45) Date of Patent: Nov. 21, 2023

(54) AUTOMATIC TENSIONING APPARATUS AND METHOD OF USE

(71) Applicant: Patz Corporation, Pound, WI (US)

(72) Inventors: Bradley J. Bedord, Suamico, WI (US); Michael J. Carncross, Crivitz, WI (US)

(73) Assignee: Patz Corporation, Pound, WI (US)

( * ) Notice: Subject to any disclaimer, the term of this patent is extended or adjusted under 35 U.S.C. 154(b) by 280 days.

(21) Appl. No.: 17/451,851

(22) Filed: Oct. 22, 2021

(65) Prior Publication Data

US 2022/0128132 A1 Apr. 28, 2022

Related U.S. Application Data

(60) Provisional application No. 63/198,537, filed on Oct. 26, 2020.

(51) Int. Cl.
| | |
|---|---|
| *F16H 19/06* | (2006.01) |
| *A01K 1/01* | (2006.01) |
| *A47L 11/24* | (2006.01) |
| *A47L 11/40* | (2006.01) |
| *B65G 23/02* | (2006.01) |

(52) U.S. Cl.
CPC ....... *F16H 19/0672* (2013.01); *A01K 1/0132* (2013.01); *A47L 11/24* (2013.01); *A47L 11/4011* (2013.01); *A47L 11/4069* (2013.01); *B65G 23/02* (2013.01); *F16H 2019/0686* (2013.01)

(58) Field of Classification Search
CPC ......... F16H 19/0672; F16H 2019/0686; A01K 1/0132; A47L 11/24; A47L 11/4011; A47L 11/4069; B65G 23/02
See application file for complete search history.

(56) References Cited

U.S. PATENT DOCUMENTS 3,223,664 A * 12/1965 Conlon .................... C08K 3/24
524/401
3,860,109 A * 1/1975 Benzmiller .......... A01K 1/0132
242/364.11

(Continued)

OTHER PUBLICATIONS

GEA A4 Cable Cleaning System Brochure—Jan. 2017.
Dura-Chain Brochure—Jan. 2012.
Patz Brochure—Feb. 2018.

*Primary Examiner* — Sharidan Carrillo
(74) *Attorney, Agent, or Firm* — James A. Joyce; Godfrey & Kahn, S.C.

(57) ABSTRACT

An automatic tensioning apparatus is provided that includes a tensioning drive unit having: a longitudinally extending stationary base frame with a plurality of guides extending between a lower portion and an upper portion, and a plurality of rotatable feed wheels axially secured at the lower portion, as well as a translatable drive frame slidably coupled to the plurality of guides with a drive assembly coupled to the drive frame, the drive assembly including a drive motor and a tensile member interface for engaging and rotationally translating a tensile member. The tensioning drive unit further including a plurality of drive frame actuators actuatable to move the drive frame between a bottom frame position and a top frame position, as well as a sensor for at least indirectly sensing the position of the drive frame along a longitudinal base frame axis.

6 Claims, 15 Drawing Sheets

(56) References Cited

U.S. PATENT DOCUMENTS

| | | | | |
|---|---|---|---|---|
| 4,243,137 A | * | 1/1981 | Laurenz | B65G 25/08 198/748 |
| 4,354,593 A | * | 10/1982 | Diedrich | B65G 25/10 15/93.1 |
| 9,284,126 B2 | | 3/2016 | Pellman et al. | |
| 2004/0261205 A1 | * | 12/2004 | Berg | A01K 1/0132 15/28 |

* cited by examiner

AUTOMATIC TENSIONING APPARATUS AND METHOD OF USE

CROSS-REFERENCE TO RELATED APPLICATION

This application claims priority to U.S. Provisional Patent Appl. No. 63/198,537 filed on Oct. 26, 2020, the disclosure of which is incorporated herein by reference in its entirety for all purposes.

FIELD OF THE INVENTION

The invention relates generally to the field of floor cleaning systems. More particularly, the invention relates to a tensioning apparatus for a floor cleaning system.

BACKGROUND

Floor cleaning systems, such as barn alley scrapers, and other shuttling circuits are commonly used to move animal waste and other debris out of an alley and into debris channels. Many such systems include a circuit formed by one or more shuttled scrapers connected to a motor via chain, wire rope, or braided rope (i.e., tensile members). Activation of the motor causes the scrapers to move along a chosen path that leads to one or more debris channels. The circuit generally includes several guides to change direction of the tensile member, often forming a rectangular configuration. The tensile member is subjected to a variable load that generally increases as the scraper(s) engage an increased debris load, causing the tensile member to stretch and cause slack to occur.

Typical systems include components for driving the tensile member. These drive systems usually consist of an A/C motor, multiple reductions through belt and pulley, gearboxes, etc., which are coupled to a sprocket or wrapped drum to engage the tensile member directly. The slack produced by wear and/or stretching in these systems should be accounted for to properly provide the required amount of tension to drive the load, and consists of excess length of tensile member that must be taken up by the driving motor before any movement of an attached cleaning device will occur. One method of removing slack is to move the position of the driving sprocket until the tensile member is under tension to the point that rotation of the motor will immediately cause movement of one or more cleaning devices.

For optimal system performance and longevity, proper tension includes a balance between not enough and too much. Not enough tension affects the ability of the drive unit to properly drive the tensile member. This may cause skipping of sprocket teeth, which can cause high impact loading on the drive system, or a sliding without rolling condition which increases surface wearing on system corner guides, and on the tensile member, it can further cause tangling or mis-winding on cable/rope systems and balling of excess chain that can lock the system up. If too much tension is provided, then one result is wasted energy that goes into producing higher loads on the drive system and the other components of the circuit, which reduces life of the system components. Another result of too much tension is extra wear and/or stretching of the tensile member. This consumable tensile member is a relatively expensive consumable in the system must be maintained by removing sections of the tensile member when the available amount of tensioning capacity is fully utilized. It is known in the prior art that this process of managing the excess slack and managing the "proper" tension is cumbersome and sometimes unpredictable.

A variety of mechanical tensioning systems are known, but include many deficiencies. One such example of a known mechanical tensioner mechanism consists of a moveable drive frame that is able to slide up and down on a vertical frame. The drive unit, which supports the tensile member, is supported by a mechanical tensioning unit consisting of a frame with a lead-screw, commonly of ACME thread, which provides the ability to manually slide the moveable drive frame up and down. To provide more tension to the tensile member, the operator must turn the lead screw, or lead screw nut, by hand to raise it up. To reduce tension, the nut or screw is rotated the opposite direction to lower the unit down. As there is very little feedback as to know when the tension is too much or too little it is up to the operator's impression of the correct tension to apply. In most cases the operator will tension the unit so that the tensile member does not ball up on the slack side of the circuit. Once the slack side is moving most operators will induce as much tension (preload) as possible to allow the circuit to run the longest possible without additional tension being added. In this situation, the operator is not providing the optimum tension for extended length and life of the machine. Instead, the operator is choosing to reduce life of the mechanical components in order to save the time of continually tensioning the circuit. Another example of a known tensioning system utilizes the same concept as previously described but in-lieu of a lead screw to drive the moveable frame, a hydraulic or pneumatic cylinder(s) does the work of moving the drive frame up or down. The improvement of utilizing hydraulics as a method for tensioning allows for meaningful feedback to the operator as to how much tension is being applied. This feedback is relayed to the operator through gauges which read the pressure in the hydraulic circuit. With a system such as this it is now possible to always set the tensioner to a certain pressure in order to get a desired and repeatable preload on the circuit.

Two types of known hydraulic systems in tensioning system can be utilized. The first is a hydraulic or pneumatic system consisting of a hand pump. The operator will manually bring the tensioner system up to pressure with the hand pump. Over time however, the system will have losses. Losses to pressure usually occur due to the wear and/or stretching of the tensile members. Additional losses come from the hydraulic/pneumatic circuit leaking or bleeding to the tank. When this occurs, the manual hydraulic/pneumatic system will require repumping to bring the system back to the desired pressure. This is burdensome on the operators and requires constant monitoring and user input. The second type of hydraulic/pneumatic system adds an electric pumping system that continually brings the system to a desired pressure. This improvement reduces the need for the operator to maintain the system.

Where the known hydraulic/pneumatic tensioner system fails is in the fact that the system is preloaded to the maximum required tension needed for the tensile member to complete its circuit. In the field of the invention these cleaning/scraping circuits build load over their run cycle. When the cleaning/scraper cycle starts, there is little to no load (requiring the least amount of pretension), as the debris is collected the tensile member will require more tension to drive the increasing load. Thus, the preload being added to the circuit should always be what is required at the maximum load of the system which only occurs at the end of the cycle. In addition, the known tensioning methodology also fails to provide optimal preload to the system due to the fact that the wasted preload at the beginning of a cleaning/scraping cycle is once again adding to the wear/stretch of the tensile member, as well as wear and strain on the drive system and other mechanical components.

Lastly, another known tensioner system is disclosed in U.S. Pat. No. 9,284,126 entitled "Automatic Scraper Chain Tensioning Apparatus." The disclosed invention utilizes multiple springs, idler rollers, and additional mechanisms on top of the traditional tensioning methods listed previously. The added bends and twists to the tensile member through these mechanisms inherently induces wear and stress on the tensile members due to the constant bending and change of tensile member direction. Additionally, the added mechanical components of idler rollers, bearings, springs, etc. lend themselves to additional maintenance, and the invention can be limited by the available and chosen size, shape, and spring constants for the mechanical springs.

It will be understood by those skilled in the art that one or more aspects of this invention can meet certain objectives, while one or more other aspects can lead to certain other objectives. Various objects, features, benefits and advantages of the invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

SUMMARY OF THE INVENTION

In at least some embodiments, an automatic tensioning apparatus is provided that includes a tensioning drive unit comprising: a longitudinally extending stationary base frame with a plurality of guides extending between a lower portion and an upper portion, and a plurality of rotatable feed wheels axially fixed at the lower portion; a translatable drive frame slidably coupled to the plurality of guides; a drive assembly secured to the drive frame, and including a drive motor and a tensile member interface for engaging and rotationally translating a tensile member; a plurality of drive frame actuators coupled to the drive frame, actuatable to move the drive frame between a bottom frame position and a top frame position, each situated between the lower portion and upper portion of the base frame; and a sensor for at least indirectly sensing the position of the drive frame; and a controller in communication with the tensioning drive unit to provide activation signals to the drive motor and the plurality of drive frame actuators based at least in part on the position of the drive frame.

In at least some other embodiments, a floor cleaning system having a circuit that includes a tensile member and a floor scraper is provided, the floor cleaning system including: a tensioning apparatus comprising: a tensioning drive unit comprising: a longitudinally extending stationary base frame with a plurality of guides extending between a lower portion and an upper portion, and a plurality of rotatable feed wheels axially fixed at the lower portion; a translatable drive frame slidably coupled to the plurality of guides; a drive assembly secured to the drive frame, and including a drive motor and a tensile member interface for engaging and rotationally translating the tensile member; a plurality of drive frame actuators coupled to the drive frame, actuatable to move the drive frame between a bottom frame position and a top frame position, each situated between the lower portion and upper portion of the base frame; and a sensor for at least indirectly sensing the position of the drive frame; and a controller in communication with the tensioning drive unit to provide activation signals to the drive motor and the plurality of drive frame actuators based at least in part on the position of the drive frame.

In at least some other additional embodiments, a tensioning drive unit is provided that includes a longitudinally extending stationary base frame having a lower portion and an upper portion, a translatable drive frame slidably coupled to the base frame; a drive assembly secured to the drive frame, and including a drive motor and a tensile member interface for engaging and rotationally translating a tensile member; and a plurality of drive frame actuators coupled to the drive frame, actuatable to move the drive frame between a bottom frame position and a top frame position, each situated between the lower portion and upper portion of the base frame.

In at least some further embodiments, an automatic tensioning apparatus is provided that includes a tensioning drive unit comprising: a longitudinally extending stationary base frame with a plurality of guides extending between a lower portion and an upper portion, and a plurality of rotatable feed wheels axially secured at the lower portion; a translatable drive frame slidably coupled to the plurality of guides; a drive assembly coupled to the drive frame, and including a drive motor and a tensile member interface for engaging and rotationally translating a tensile member; a plurality of drive frame actuators actuatable to move the drive frame between a bottom frame position and a top frame position; and a sensor for at least indirectly sensing the position of the drive frame along a longitudinal base frame axis.

In at least yet some other embodiments, a floor cleaning system having a circuit that includes a tensile member and a floor scraper is provided, the system comprising: a tensioning drive unit comprising: a longitudinally extending stationary base frame with a plurality of guides extending between a lower portion and an upper portion, and a plurality of rotatable feed wheels axially secured at the lower portion; a translatable drive frame slidably coupled to the plurality of guides; a drive assembly coupled to the drive frame, and including a drive motor and a tensile member interface for engaging and rotationally translating a tensile member; a plurality of drive frame actuators actuatable to move the drive frame between a bottom frame position and a top frame position; and a sensor for at least indirectly sensing the position of the drive frame along a longitudinal base frame axis; and a controller in communication with the tensioning drive unit to provide activation signals to the drive motor and the plurality of drive frame actuators based at least in part on the position of the drive frame.

In still yet another embodiment, a method of use for an automatic tensioning apparatus is provided comprising: positioning a drive frame and drive assembly, movably coupled to a longitudinally extending stationary base frame, in a bottom adjustment position along the base frame using a plurality of drive frame actuators coupled to the drive frame and base frame, wherein a tensile member is rotationally engaged with the drive assembly to provide translation of the tensile member; actuating the plurality of drive frame actuators to cause vertical translation of the drive frame to remove slack in the tensile member, wherein the tensile member forms part of a continuous circuit engaging a plurality of movable cleaning devices; storing as a minimum pressure, a sensed pressure exerted to extend the plurality of drive frame actuators to remove the slack; continue actuating the actuators until the sensed pressure has exceeded the minimum pressure, storing a detected current position of the drive frame relative to the base frame as a target position, and the minimum pressure as a minimum preload pressure; activating a cleaning cycle that includes rotating a drive motor of the drive assembly in a first rotational direction to move the plurality of movable cleaning devices in a first longitudinal direction; comparing the detected current position of the drive frame with the target position, if the detected current position is at or below a pre-defined maximum lower offset position measured from the target position, then actuate the plurality of drive frame actuators to move the drive frame to the target position; and detecting completion of the cleaning cycle and updating the target position value that is stored to be equal to the detected current position.

Other embodiments, aspects, and features of the invention will be understood and appreciated upon a full reading of the detailed description and the claims that follow.

BRIEF DESCRIPTION OF THE DRAWINGS

Embodiments of the invention are disclosed with reference to the accompanying drawings and are for illustrative purposes only. The invention is not limited in application to the details of construction, or the arrangement of the components illustrated in the drawings. The invention is capable of other embodiments and/or of being practiced or carried out in other various ways.

DETAILED DESCRIPTION

Figure 1:
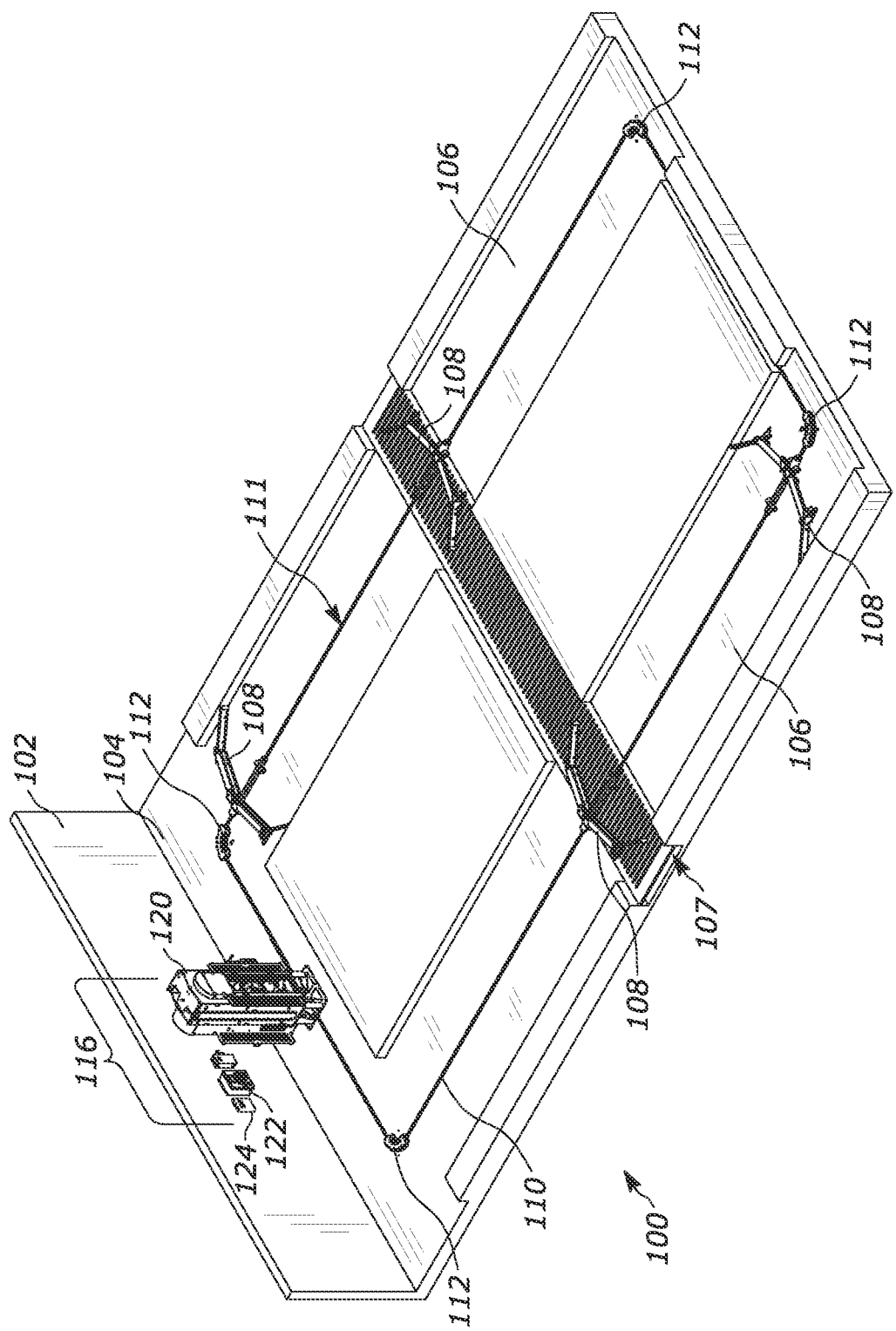
FIG. 1 is a top perspective view of an exemplary floor cleaning system positioned relative to an exemplary barn floor and wall. The floor cleaning system including an exemplary automatic tensioning apparatus comprising a tensioning drive unit, a controller, and a junction box.

FIG. 1 illustrates an exemplary floor cleaning system 100 positioned relative to a wall 102 and a floor 104. The wall 102 and floor 104 are exemplary and are provided for illustrative purposes to show the layout of an exemplary barn floor cleaning configuration. For clarification, the wall 102 and floor 104 are not considered part of the floor cleaning system 100 itself, but serve as structure with which the floor cleaning system 100 can be implemented therewith. As shown in FIG. 1, the floor 104 includes two exemplary longitudinal parallel alleys 106, each having interconnected cleaning devices, such as floor scrapers 108 situated at least partially within the alley 106 and positioned to direct debris into a debris channel 107. The scrapers 108 are further coupled by a tensile member 110 to form a circuit 111 (i.e., a continuous circuit/loop of connections). The tensile member 110 can include various individual lengths (e.g., coupled between scrapers 108, etc.) or a continuous loop coupled to the scrapers 108. For simplicity, the term tensile member 110 used herein can refer to either configuration. Further, the tensile member 110 can take many forms such as a chain, a rope, a cable, etc. A plurality of roller guides 112 are provided at the corners to change the direction of the tensile member 110 accordingly. The roller guides 112 are secured in position (e.g., to the floor 104) and unlike the scrapers 108, remain anchored in place during operation of the floor cleaning system 100. The tensile member 110 is fixedly secured to the scrapers 108, but allowed to rotate along the roller guides 112.

The floor cleaning system 100 further includes an exemplary automatic tensioning apparatus 116, that in at least some embodiments, comprises an exemplary tensioning drive unit 120, a controller 122, and one or more junction boxes 124. The tensioning drive unit 120 provides a means to move/translate and properly tension the tensile member 110. When the tensioning drive unit 120 is activated to move the tensile member 110, the coupled scrapers 108 are also moved along the alleys to push waste and debris. As the floor cleaning system 100 shown in FIG. 1 is exemplary, it shall be understood that the quantity and positioning of various components, such as the scrapers 108, tensile member 110, roller guides 112, etc. can vary to accommodate a desired circuit shape and configuration.

Figure 2:
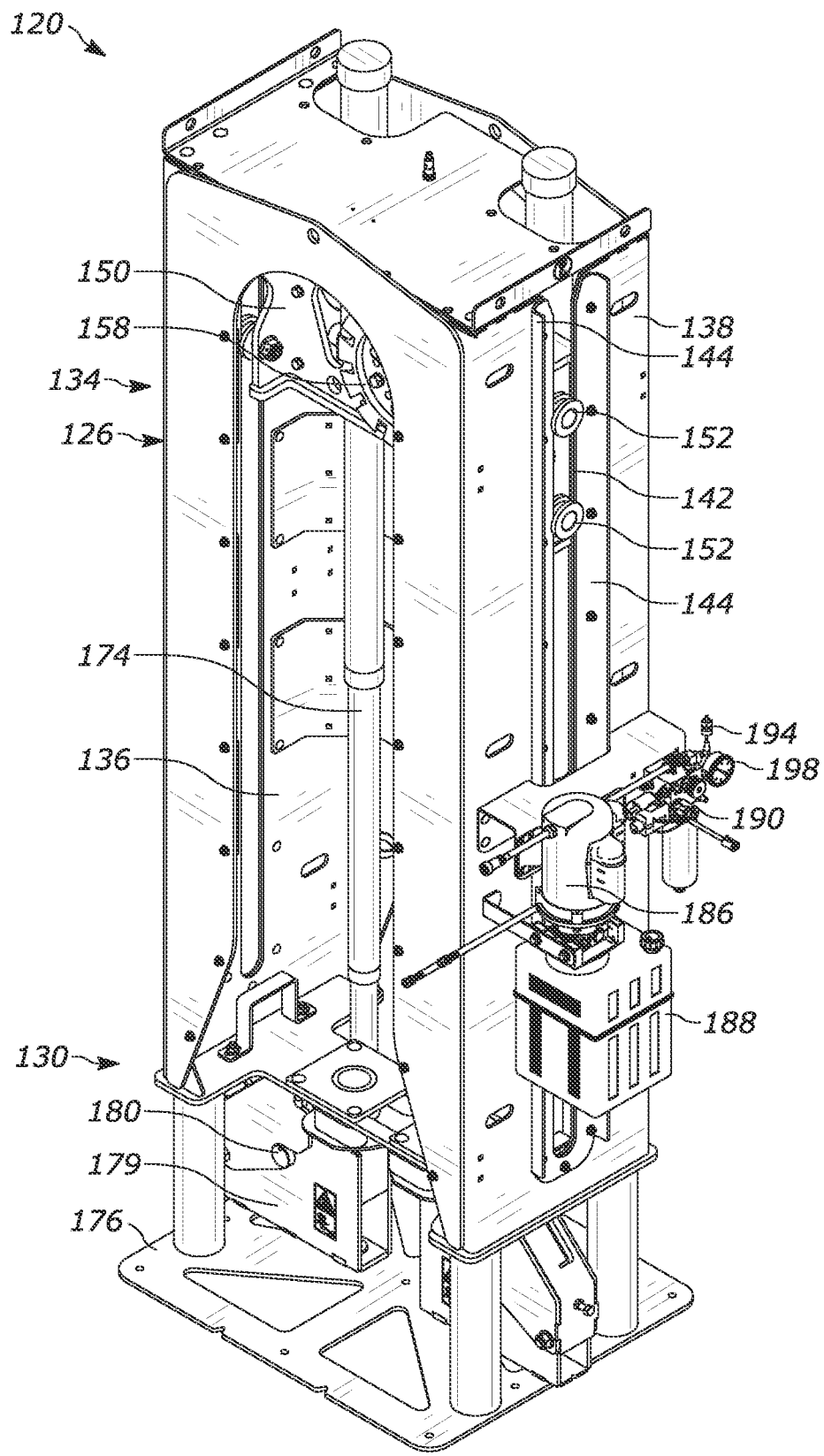
FIG. 2 is a front perspective view of the tensioning drive unit of FIG. 1.
Figure 3:
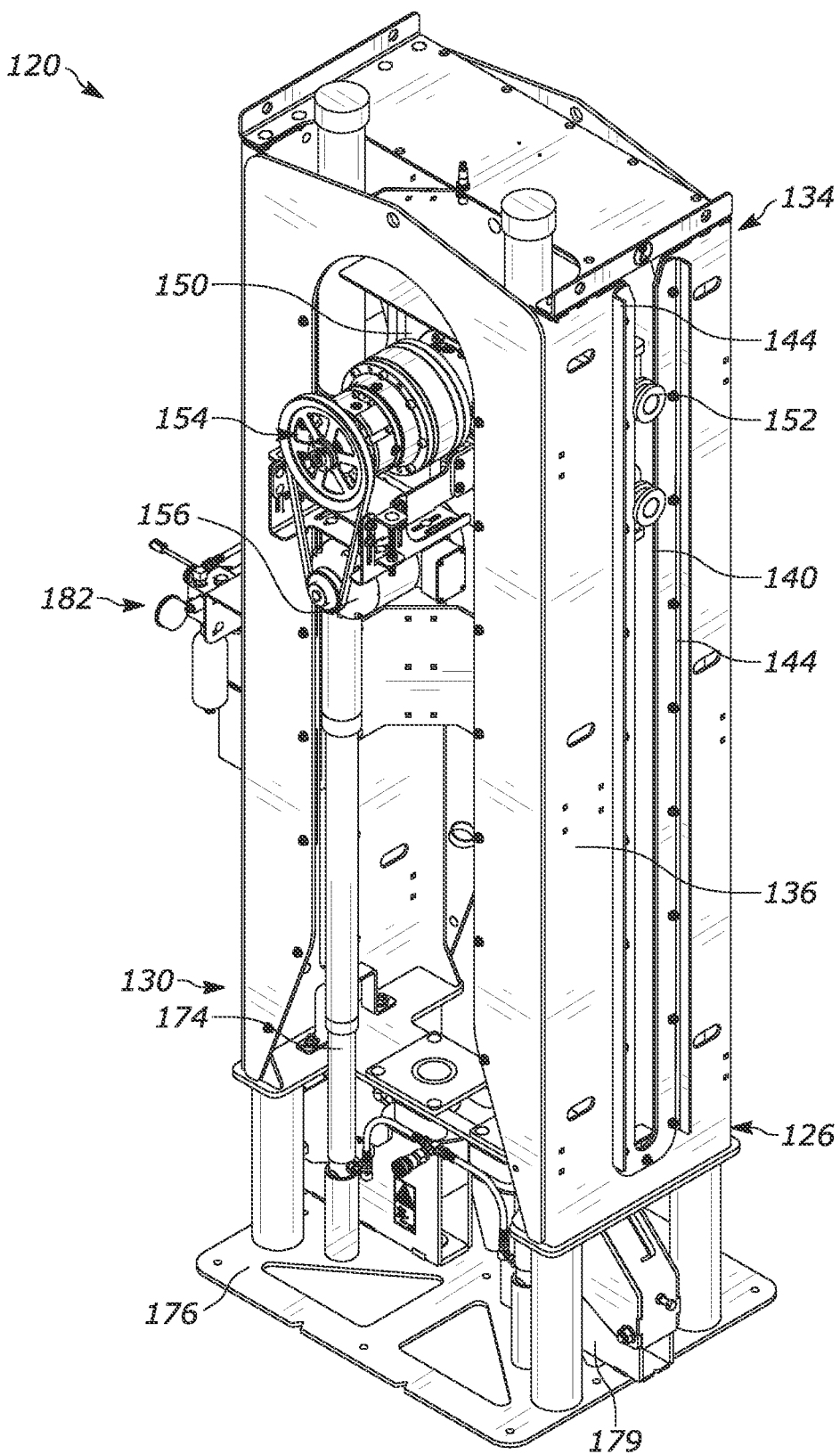
FIG. 3 is a rear perspective view of the tensioning drive unit.
Figure 4:
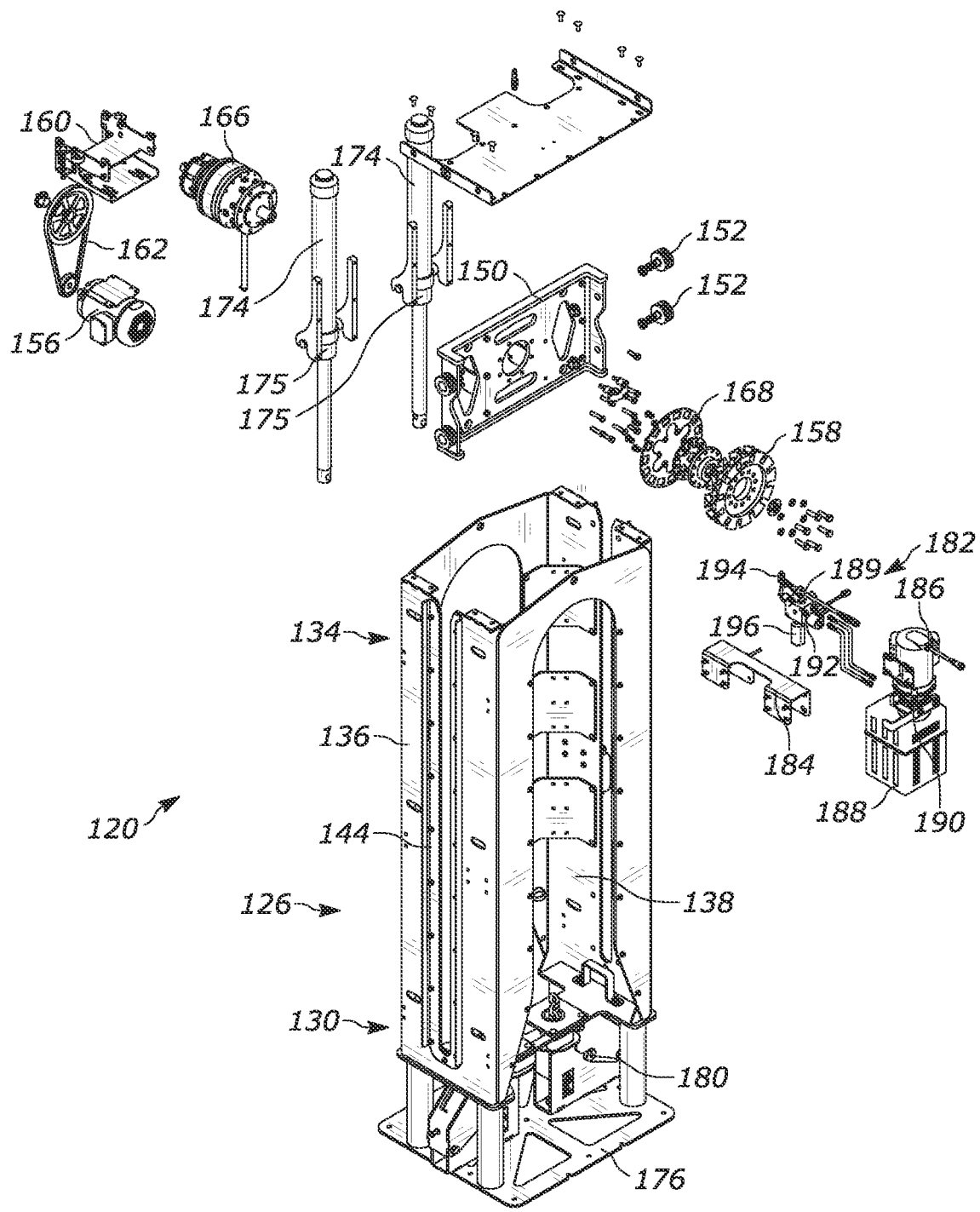
FIG. 4 is an exploded perspective view of the tensioning drive unit.

Referring to FIGS. 2 and 3, the exemplary tensioning drive unit 120 from FIG. 1 is shown in front and rear perspective views, while FIG. 4 provides an exploded view of the tensioning drive unit 120. The tensioning drive unit 120 includes a longitudinally extending stationary base frame 126 that provides primary structural support. The base frame 126 includes a lower portion 130 and an upper portion 134. The base frame 126 further includes a first side wall 136 and a second side wall 138 extending between the lower portion 130 and the upper portion 134, wherein the sidewalls include a plurality of guides. In at least some embodiments, the plurality of guides can include a first guide 140 extending longitudinally along the first side wall 136 and a second guide 142 extending longitudinally along the second side wall 138. In at least some embodiments, the guides can take the form of slots, and can be reinforced with longitudinally extending inner or outer slotted reinforcement portions, such as reinforcement portions 144.

The tensioning drive unit 120 further includes a translatable drive frame 150. The drive frame 150 is slidably coupled to the guides 140, 142 to allow the drive frame 150 to translate between the lower portion 130 and the upper portion 134. In at least some embodiments, the drive frame 150 includes a plurality of rollers 152 rotatably secured to the drive frame 150, wherein the rollers 152 are sized and shaped to slidingly engage with the guides 140, 142 such that the drive frame 150 is restricted to move only longitudinally between the lower portion 130 and the upper portion 134 along a fixed longitudinal base frame axis 172 (see FIG. 7).

Figure 5:
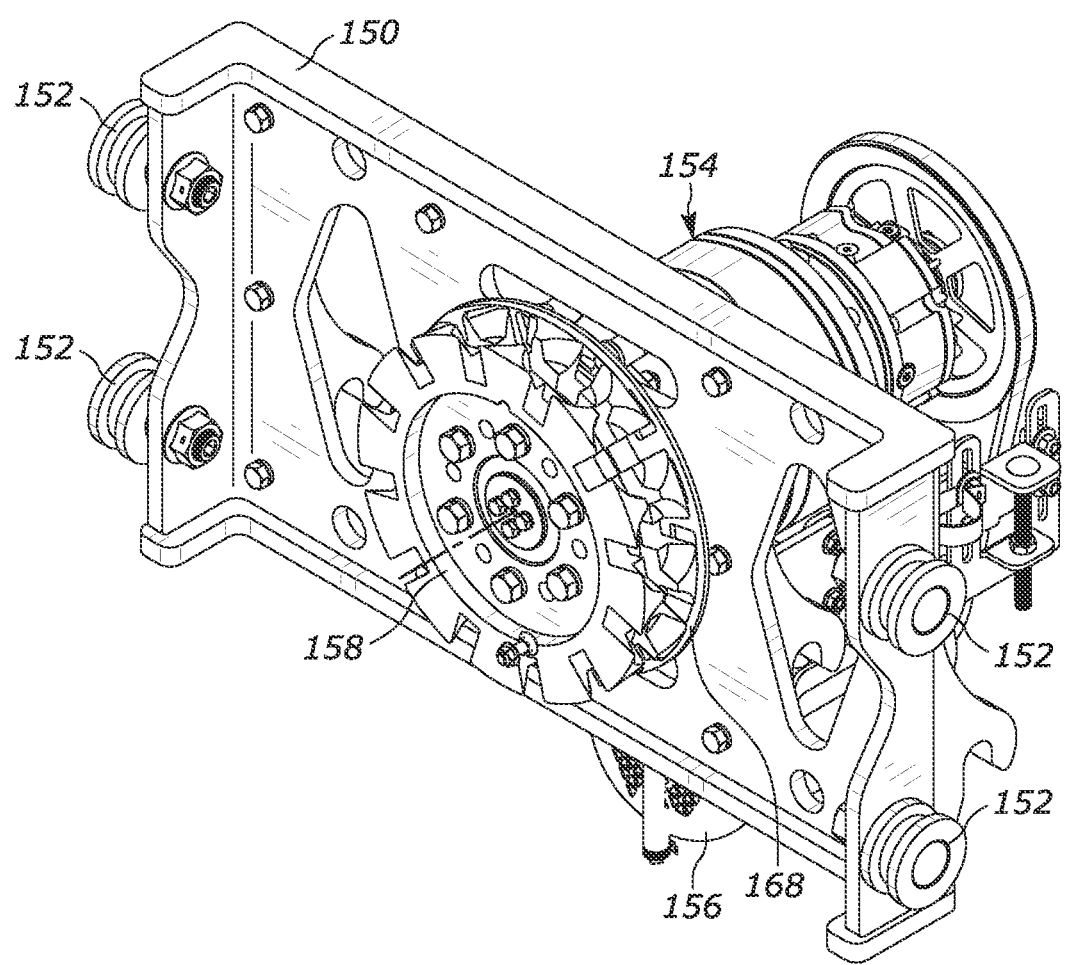
FIG. 5 is front perspective view of an exemplary drive frame and drive assembly of the tensioning drive unit of FIG. 1.
Figure 6:
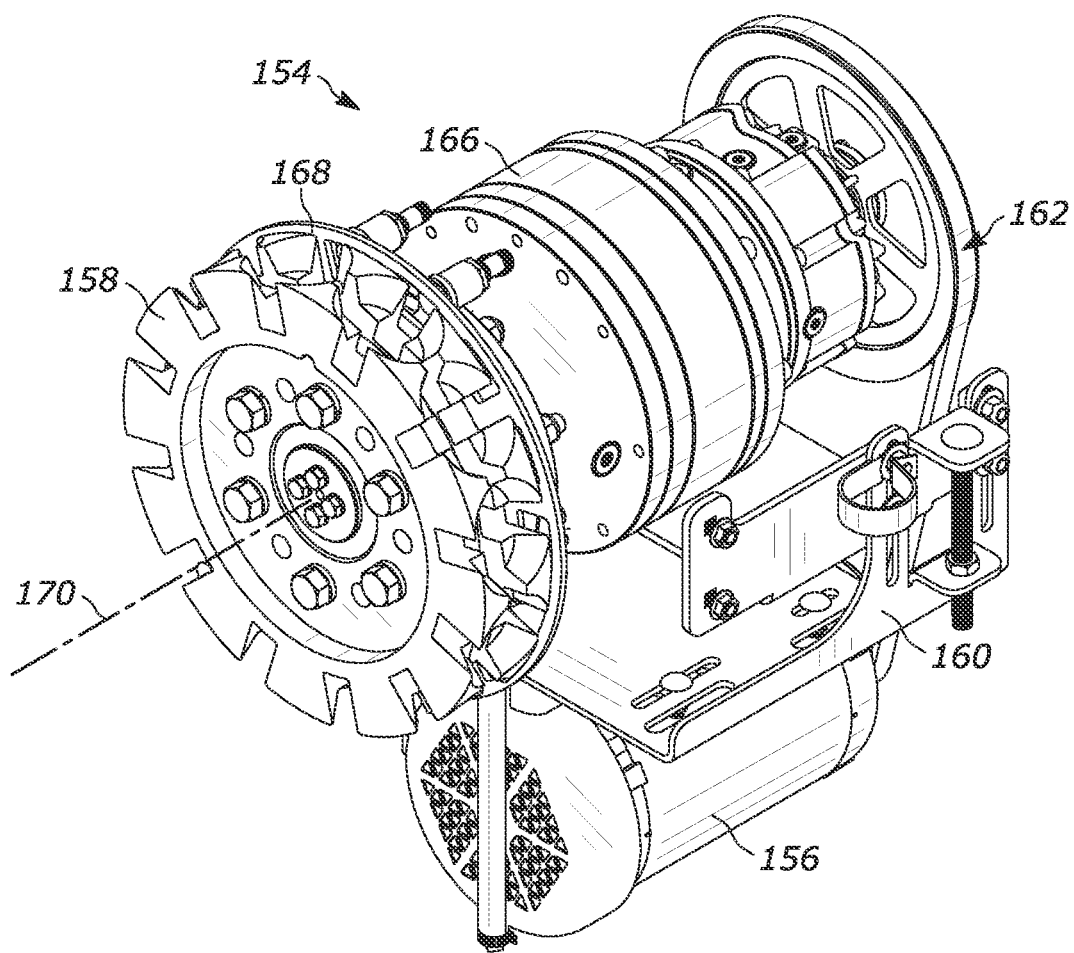
FIG. 6 is front perspective view of the drive assembly.

Secured to the drive frame 150 is a drive assembly 154 (see FIGS. 5 and 6). The drive assembly 154 includes a drive motor 156 coupled with a tensile member interface 158 that engages and translates the tensile member 110, to move the associated circuit 111 (i.e., causing the scrapers 108 to move as desired). The tensile member interface 158 can vary in shape and size depending on the type of tensile member 110 it is intended to be engaged with. For example, when the tensile member 110 is a chain, the tensile member interface 158 can be a sprocket, and when the tensile member 110 is a cable or rope, the tensile member interface 158 can be a wrapped drum, etc. In at least some embodiments, the tensile member interface 158 is circular.

In at least some embodiments, the drive assembly 154 can include various other components, such as a motor mount 160, a belt and pulley reduction assembly 162, a gearbox reduction 166, and an encoder wheel 168, while in other embodiments, less or more components can be included. As shown in the figures, the drive assembly 154 is secured to the drive frame 150 such that the tensile member interface 158 (and encoder wheel 168) rotates about a drive axis 170 that extends perpendicular to the longitudinal base frame axis 172.

The drive frame 150 is translatable between the lower portion 130 and the upper portion 134 of the base frame 126 using a plurality of drive frame actuators 174 coupled therewith. In at least some embodiments, the drive frame actuators 174 include telescopic hydraulic cylinders 175, while in other embodiments, any of various other known types of actuators can be utilized, such as pneumatic actuators, electric linear actuators, non-telescopic hydraulic cylinders, etc. The drive frame 150 can be adapted to utilize various types and quantities of drive frame actuators 174 including one actuator, or two or more actuators.

As noted above, the base frame 126 is stationary and configured to be secured in place, such as to the floor 104. In at least some embodiments, the base frame 126 includes a bottom mounting plate 176 for securement to the floor 104. The base frame 126 can also include a plurality of tensile member feed wheels 178 rotatably secured to wheel supports 179 on the base frame 126. The wheel supports 179 include axial wheel mounts 180.

When hydraulic drive frame actuators 174 are utilized, a hydraulic system 182 can be provided for actuating the drive frame actuators 174. The hydraulic system 182 can be mounted to the drive frame 126 as part of the tensioning drive unit 120 or can be mounted remotely and coupled to the tensioning drive unit 120. In at least some embodiments, the hydraulic system 182 includes a 184 mount, an electric pump 186, a reservoir 188, a hydraulic control valve block 189, a dump valve 190, a proportional relief valve 192, a pressure transducer 194, an accumulator 196, and a pressure gauge 198, along with various interconnections (e.g. rigid lines, hoses, fittings, etc.), while in other embodiments, less or more components can be included.

Figure 7:
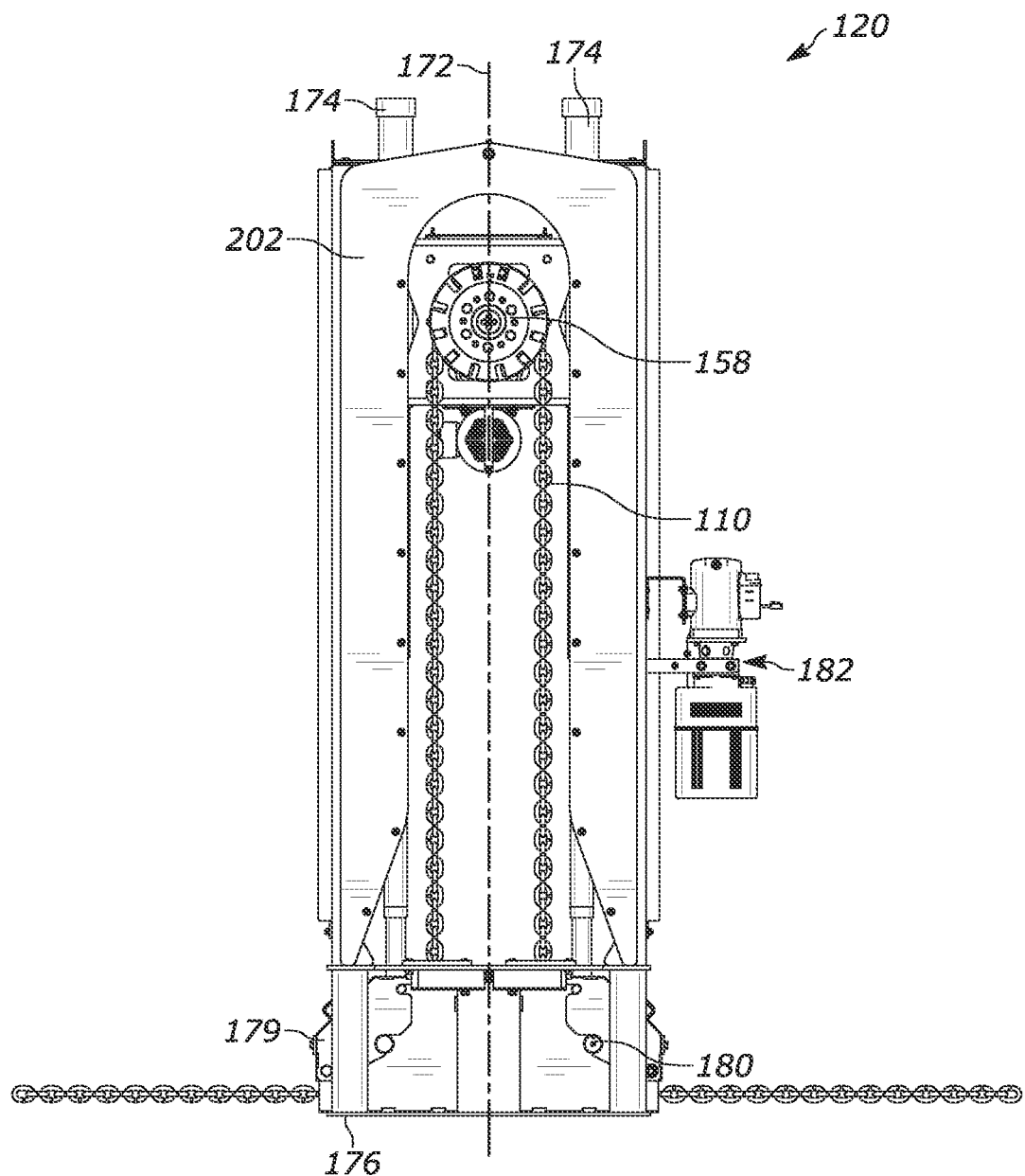
FIG. 7 is a front view of the tensioning drive unit coupled with an exemplary tensile member.
Figure 8:
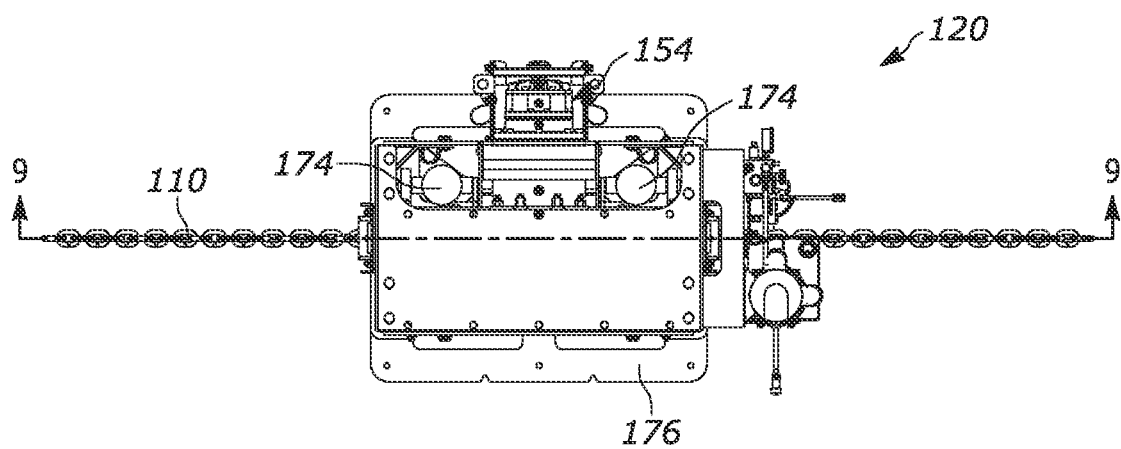
FIG. 8 is a top view of the tensioning drive unit coupled with the tensile member.
Figure 9:
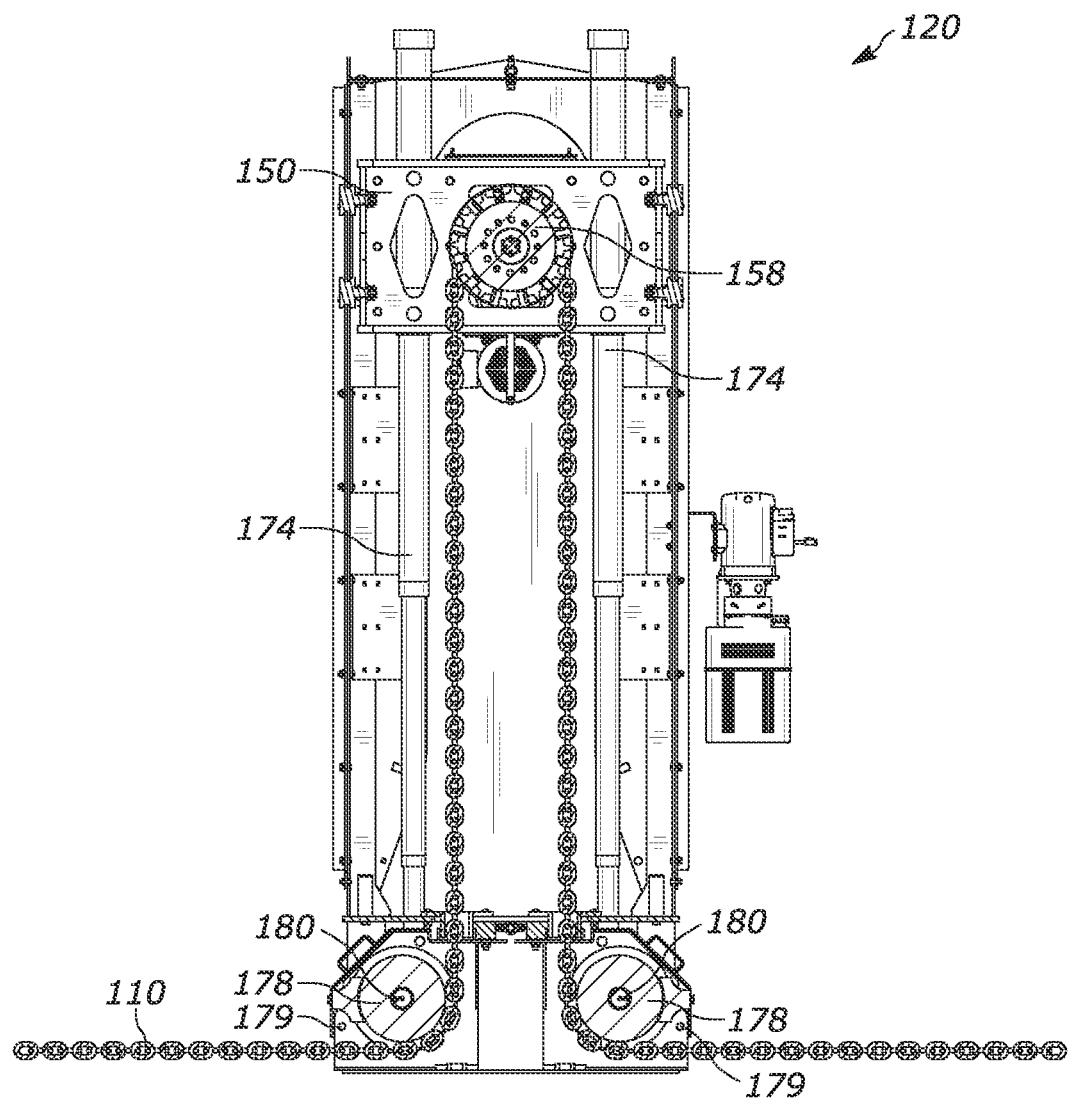
FIG. 9 is a cross-sectional front view of the tensioning drive unit taken along line 9-9 of FIG. 8.

FIGS. 7 and 8 provide front and top perspective views of the tensioning drive unit 120 engaged with a tensile member 110. For illustrative purposes, only a portion of the tensile member 110 is shown, further the tensile member 110 is shown as a chain and the tensile member interface 158 is shown as a sprocket. FIG. 9 is a cross-sectional view of the tensioning drive unit 120 taken along line 9-9 of FIG. 8 showing the tensile member 110 extending horizontally and entering the tensioning drive unit 120 and engaging with the feed wheel 178 at the entrance to redirect the tensile member 110 upwards to the tensile member interface 158 and wrapping thereover, then extending downward to the other feed wheel 178 at the exit, and being redirected out along the horizontal. This configuration allows the tensile member 110, which typically extends along the floor 104 (e.g., horizontal) to enter and leave at the same level, although the position and quantity of the feed wheels 178 could vary to accommodate different entry and exit heights, and load requirements.

Figure 10:
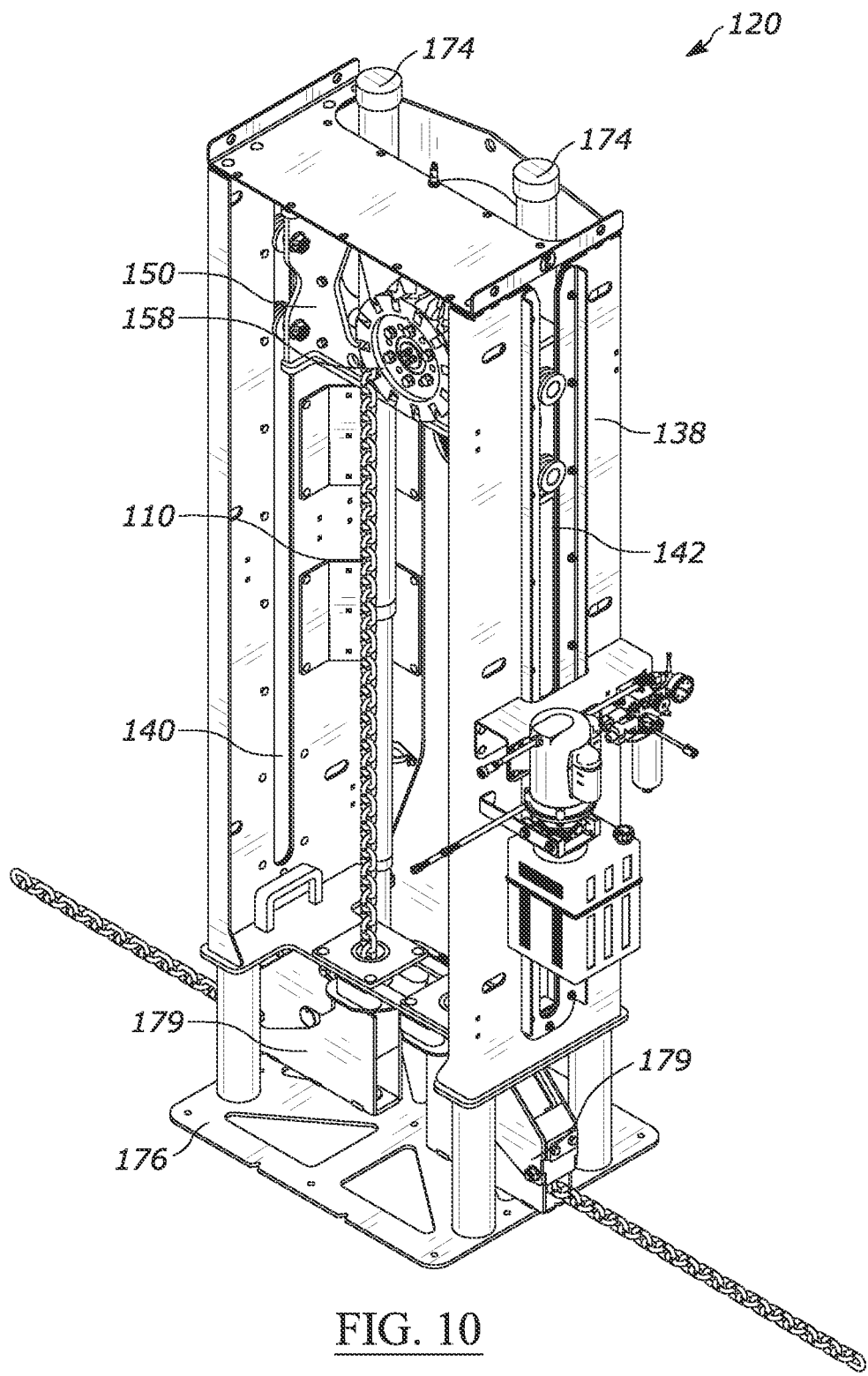
FIG. 10 is front perspective view of the tensioning drive unit and tensile member of FIG. 7 with the front cover of the tensioning drive unit removed for illustrative purposes, showing the drive frame in a top frame position.
Figure 11:
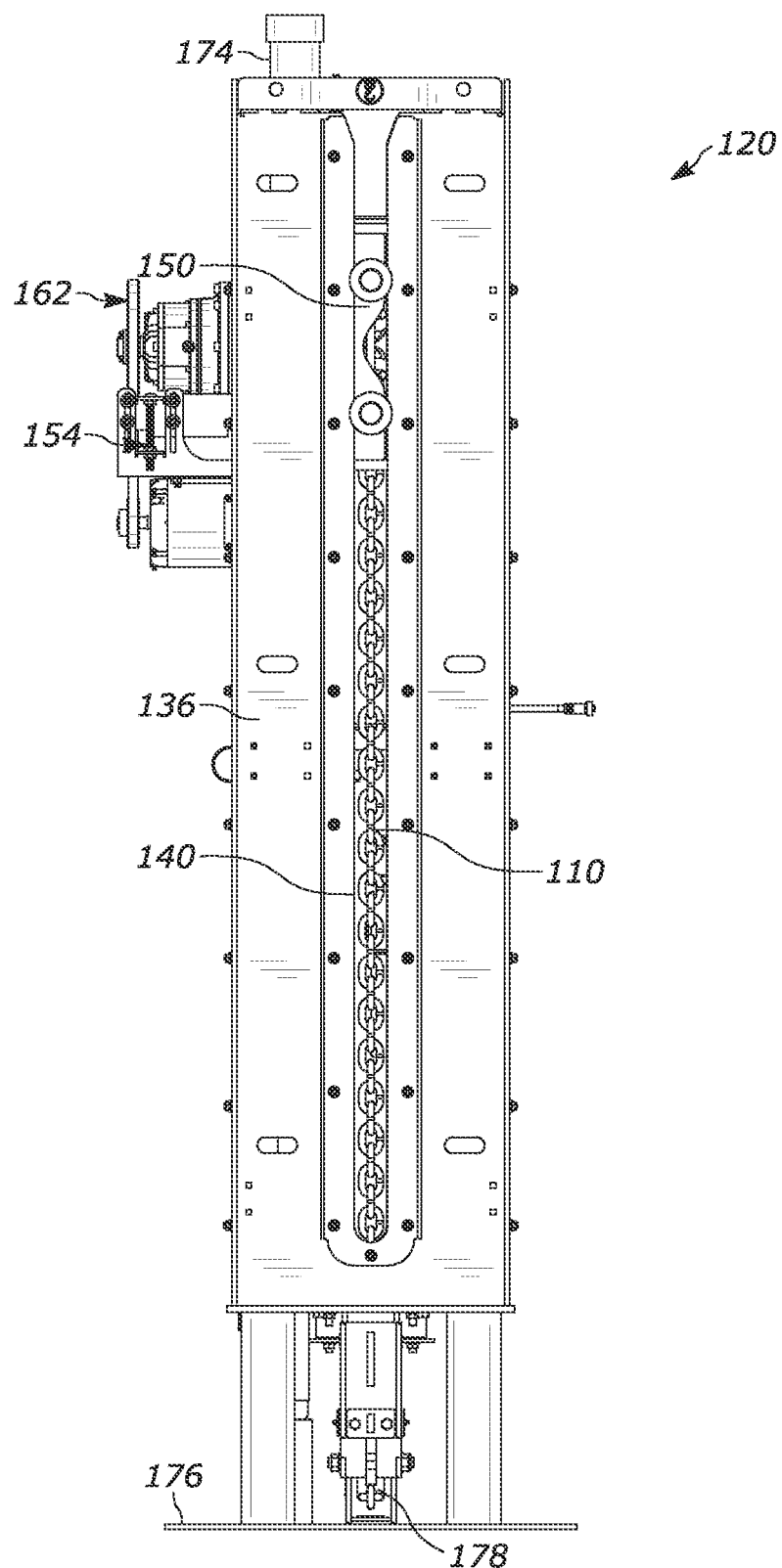
FIG. 11 is side view of the tensioning drive unit and tensile member of FIG. 10
Figure 12:
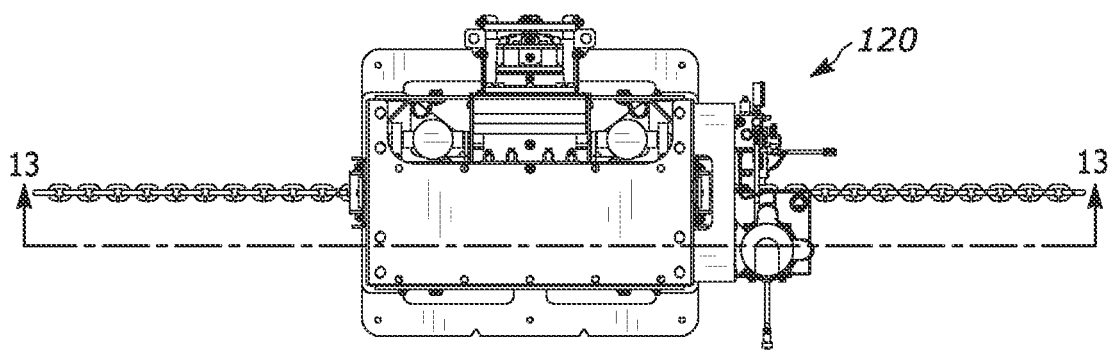
FIG. 12 is top view of the tensioning drive unit and tensile member of FIG. 10.
Figure 13:
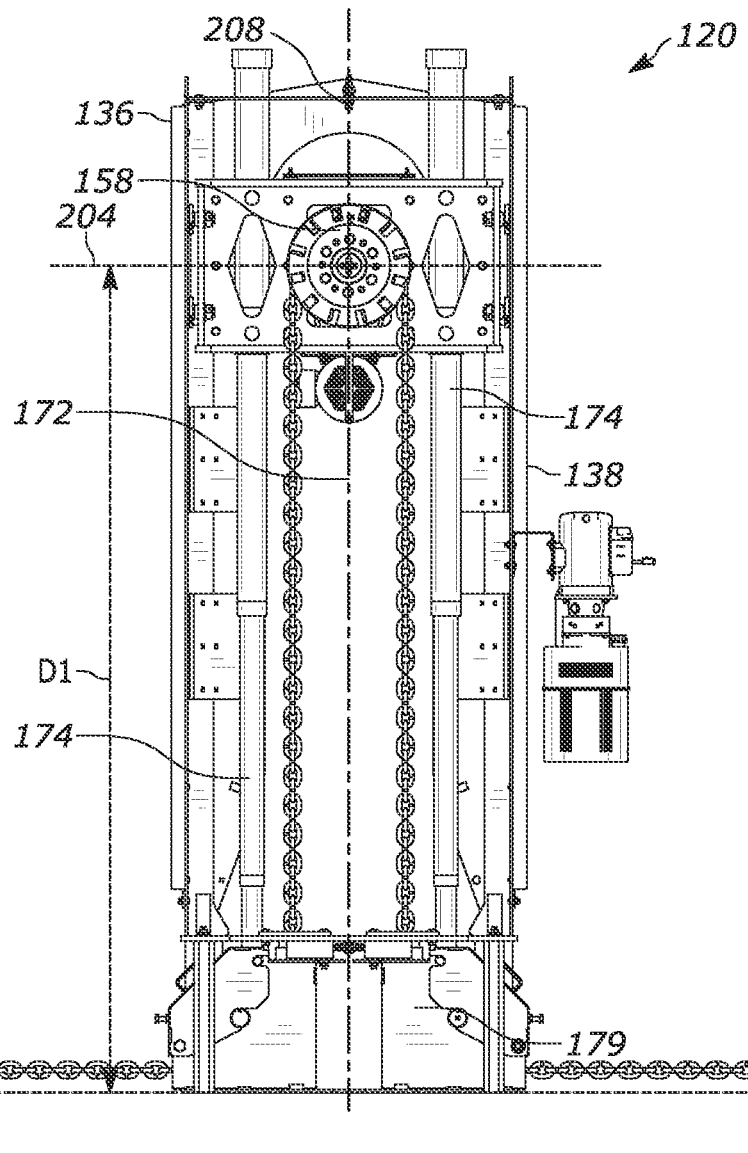
FIG. 13 is a cross-sectional view of the tensioning drive unit taken along line 13-13 of FIG. 12.

Referring to FIGS. 10-12, front perspective, side, and top views of the tensioning drive unit 120 and tensile member of FIG. 7 are provided with the front cover 202 of the tensioning drive unit 120 removed for illustrative purposes. FIG. 13 provides a cross-sectional view of the tensioning drive unit 120 taken along line 13-13 of FIG. 12. As seen in FIGS. 11-13, the drive frame actuators 174 are fully extended to place the drive frame 150 in a top adjustment position 204 along the base frame axis 172, situated near the top, at a distance D1 from the bottom mounting plate 176.

Figure 14:
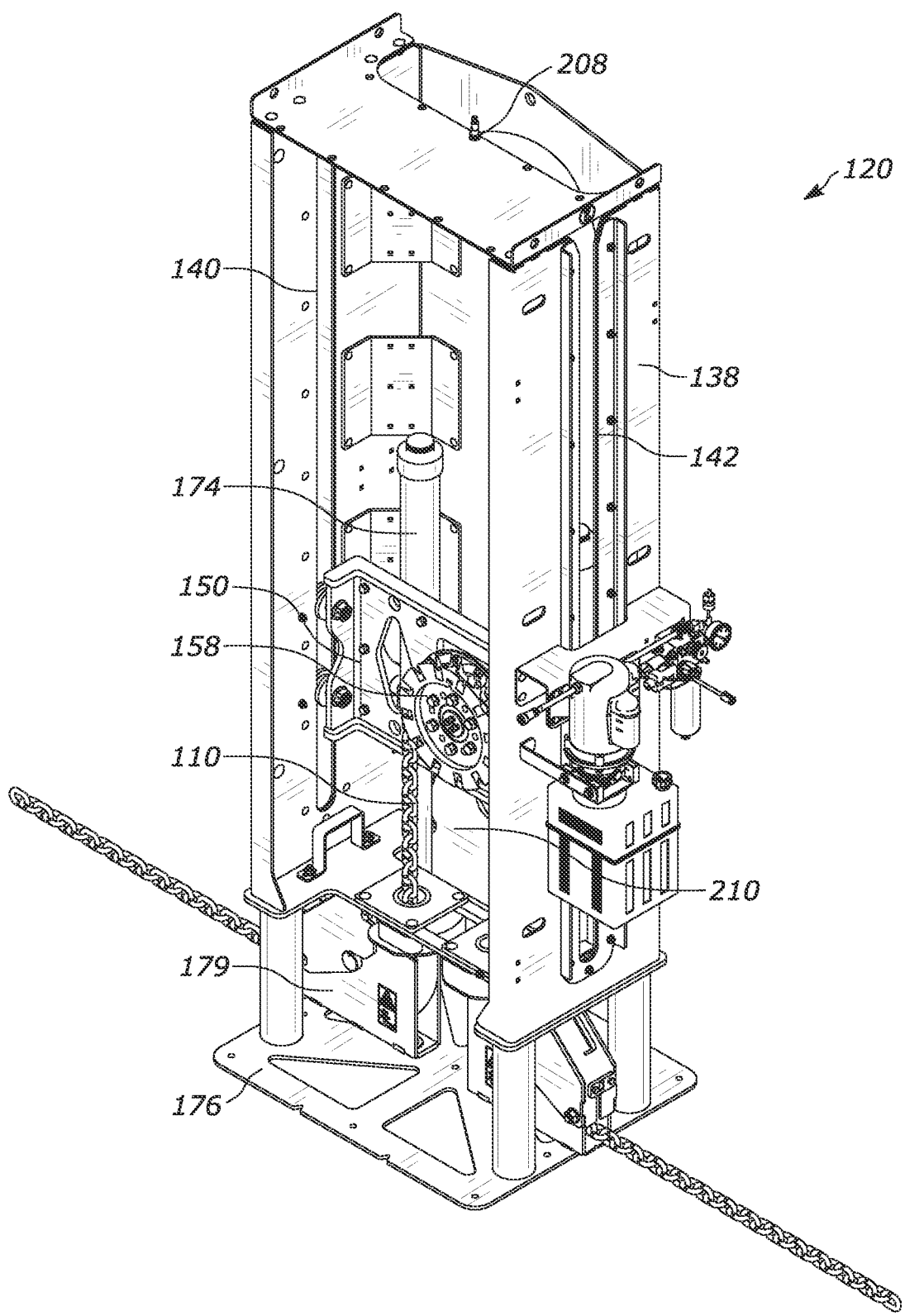
FIG. 14 is front perspective view of the tensioning drive unit and tensile member with the front cover of the tensioning drive unit removed for illustrative purposes, showing the drive frame in a bottom frame position.
Figure 15:
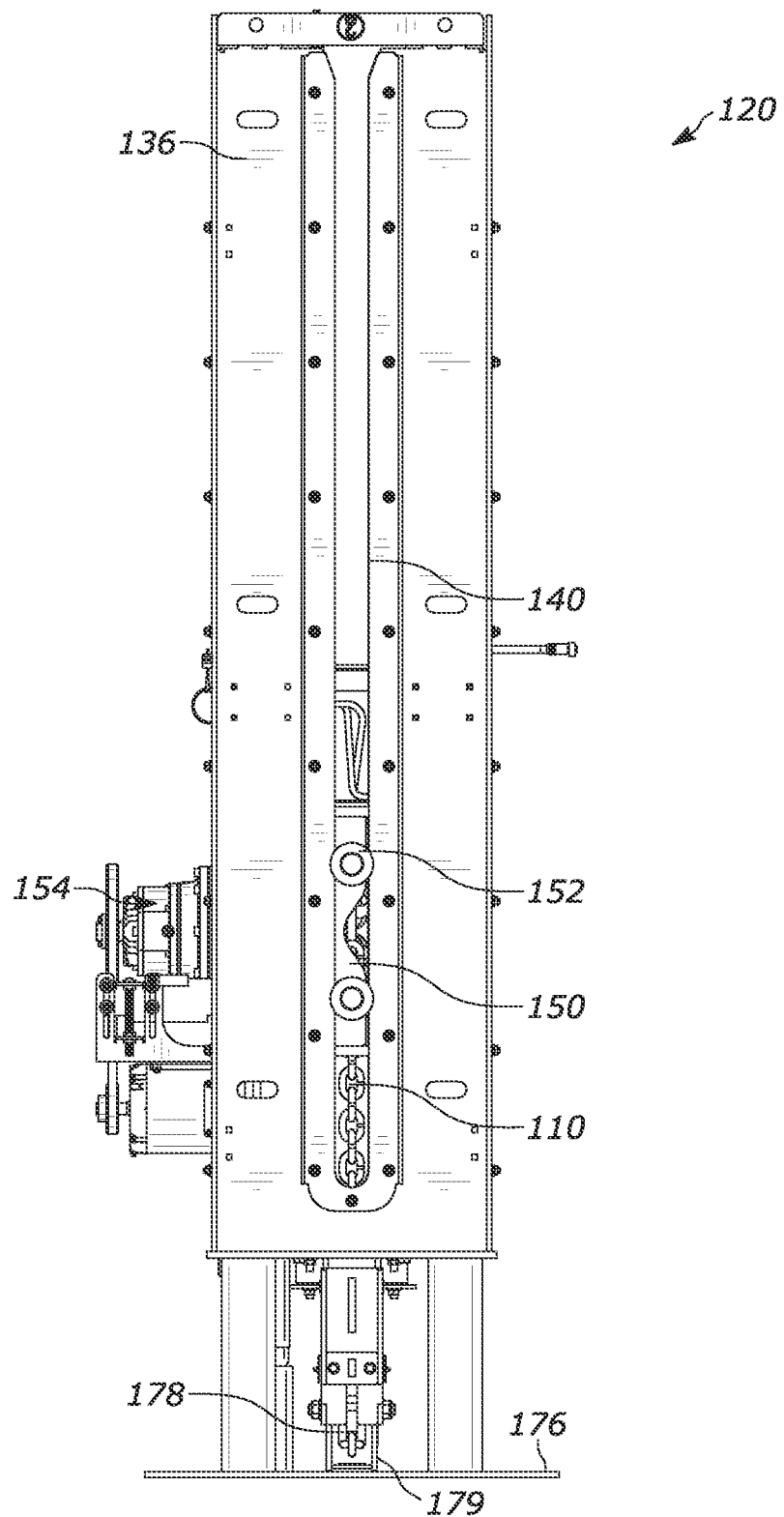
FIG. 15 is side view of the tensioning drive unit and tensile member of FIG. 14
Figure 16:
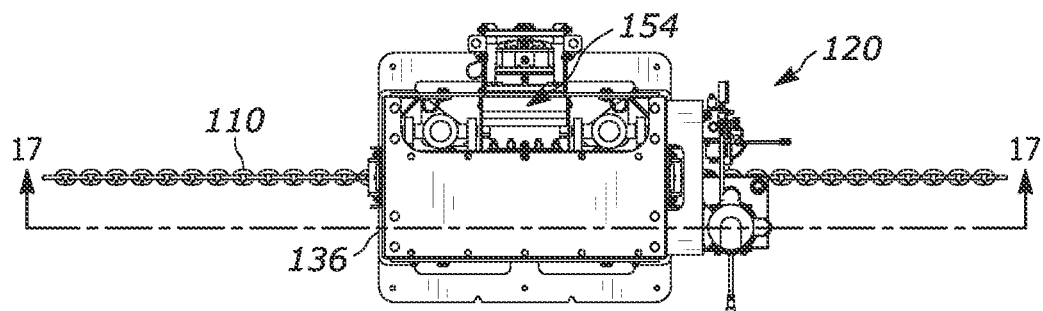
FIG. 16 is top view of the tensioning drive unit and tensile member of FIG. 14.
Figure 17:
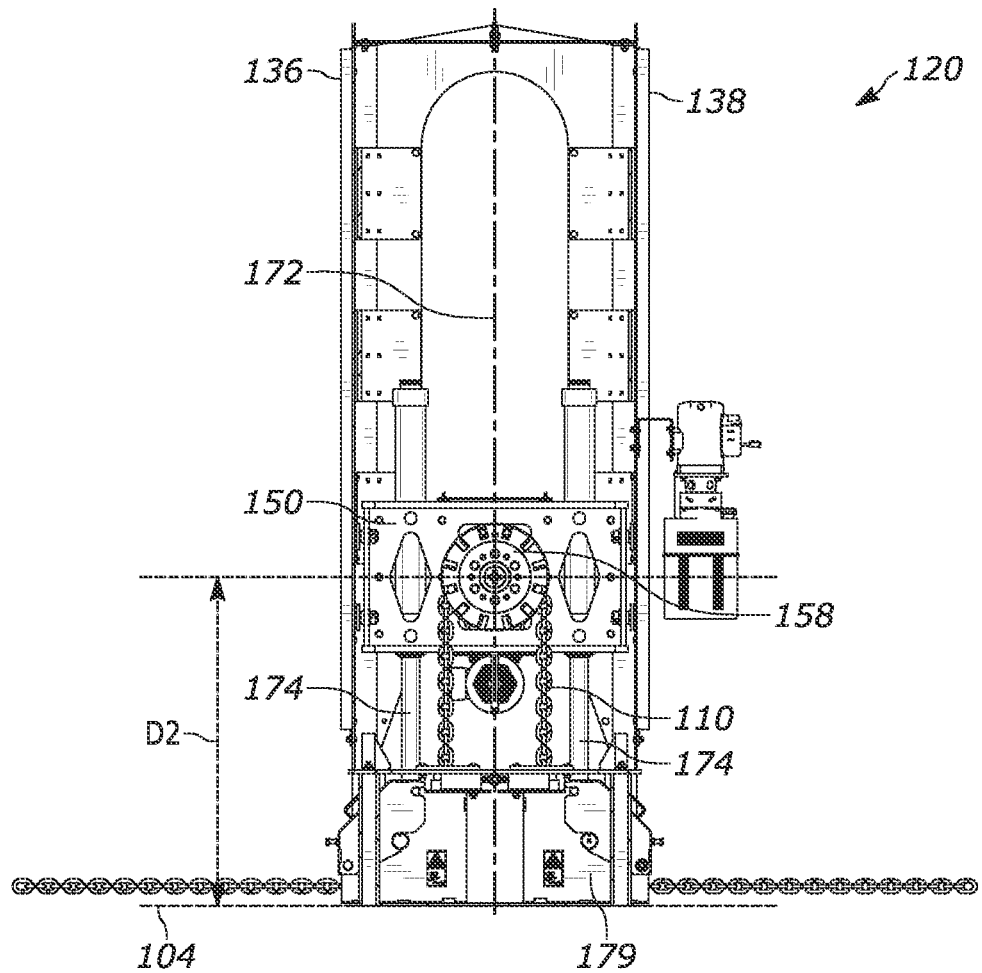
FIG. 17 is a cross-sectional view of the tensioning drive unit taken along line 17-17 of FIG. 16.

Referring to FIGS. 14-16, front perspective, side, and top views of the tensioning drive unit 120 and tensile member are provided with the front cover 202 of the tensioning drive unit 120 removed for illustrative purposes, similar to FIGS. 10-12, but with the drive frame repositioned. FIG. 17 provides a cross-sectional view of the tensioning drive unit 120 taken along line 17-17 of FIG. 16. As seen in FIGS. 14-17, the drive frame actuators 174 are no longer fully extended, but are retracted to place the drive frame 150 in a bottom adjustment position 206 along the base frame axis 172, situated near the bottom, at a distance D2 from the bottom mounting plate 176.

The tensioning drive unit 120 further includes at least one sensor 208 (e.g., FIG. 14) configured to at least indirectly monitor the position of the drive frame 150 relative to the base frame 126, as this can be accomplished in numerous ways, the sensor 208 can take many forms. For example, the sensor can be an ultrasonic distance sensor (FIG. 13) positioned on the base frame 126 above the drive frame 150. In other embodiments, the sensor can be located in other locations and utilize other known technologies, such as laser, proximity, photoelectric, fiber optic, etc. Further, in at least some embodiments, the term sensor can be construed to include another component that can provide position sensing indirectly.

Referring to FIGS. 13 and 17, raising or lower the drive frame 150 provides increased or decreased tension to a coupled tensile member 110 connected in the circuit 111 that has a fixed length, resulting in a decrease or increase in slack. Raising and lowering of the drive frame 150 is performed by the plurality of drive frame actuators 174 based on control signals received from the controller 122 (FIG. 1) in communication with the tensioning drive unit 120.

The controller 122 provides control of the tensioning drive unit 120 to operate the floor cleaning system 100. As the automatic tensioning apparatus 116 can utilize various hydraulic, electric, and/or pneumatic devices, one or more junction boxes 124 can be utilized to facilitate supply and/or distribution thereof, as such it should be understood that these components can be mounted in various locations and include various typical interconnecting lines, hoses, cables, wires, etc. to distribute these resources. In at least some embodiments, the drive motor 156 is controlled by a Variable Frequency Drive (VFD), which can be housed with the controller 122. For reference, the bottom adjustment position 206 along the base frame axis 172 can be considered a zero point on the base frame axis 172, with a height value along the base frame axis 172 increasing in value as it extends to the top adjustment position 204.

The controller 122 can communicate with the tensioning drive unit 120 and a user to send and receive commands and information to operate the tensioning drive unit 120. The controller 122 can be housed in a plurality of boxes and in at least some embodiments, includes a Programmable Logic Controller (PLC) and a Human Machine Interface (HMI), such as a PLC model no. FX5UC-32MT/DSS-TS and an HMI model no. GT2105-QTBDS, both manufactured by Mitsubishi. In other embodiments, the controller 122 can include any of various types of processor-driven I/O configurations capable of providing the described operations. Communication with the PLC and HMI can occur via various known methods, such as direct link, remote link, touchscreen, etc. and can utilize various software programs and/or protocols to effectuate the desired operation. The HMI provides a user interface between the user and the controller 122 and in at least some embodiments, can include a local or remote screen/interface, wherein the user can enter various pre-selected values (e.g., height values) to be utilized during the operation of the tensioning drive unit 120. In at least some embodiments the HMI can merely include various buttons, dials, switches, etc. actuatable by a user to effectuate operation of the automatic tensioning apparatus 116 as desired. The PLC can further include memory for storing values. The controller 122 can include internal memory for storing positional values, and/or be in communication with an external memory (e.g., hard drive, RAM, etc.)

Referring back to FIG. 1, the tensile member 110 is coupled to scrapers 108 to form a circuit 111. To move the scrapers 108 the drive assembly 154 is activated by the controller 122. Moving the scrapers 108 in a first direction requires the tensile member 110 to be translated through the tensioning drive unit 120 via activation of the drive assembly 154 to rotate the tensile member interface 158 in a first rotational direction to pull the tensile member 110 in and to pass it back out. Activation of the drive assembly 154 to rotate the tensile member interface 158 in a (opposite) second rotational direction causes the tensile member 110 to be pulled into the tensioning drive unit 120 on the opposite side and passed out.

The automatic tensioning apparatus 116 is configured to monitor tension on the tensile member 110 as it rotates the circuit 111 moving the scrapers 108. As discussed above, too much tension creates excessive strain on the system and too little tension allows for excessive slack, which also creates excessive strain on the system. As such it is desirable to maintain a "proper" level of tension between the extremes. To monitor the amount of tension on the tensile member 110, the downward force 210 (FIG. 14) being imparted to the tensile member interface 158 can be identified using various methods. One such method is to monitor the system pressure being exerted on the drive frame actuators 174 that support the drive frame 150 and resist the downward force 210, which in at least some embodiments, is the pressure measured at the pressure transducer 194 and/or pressure gauge 198 of the hydraulic system 182 used to extend and retract the drive frame actuators 174.

Figure 18:
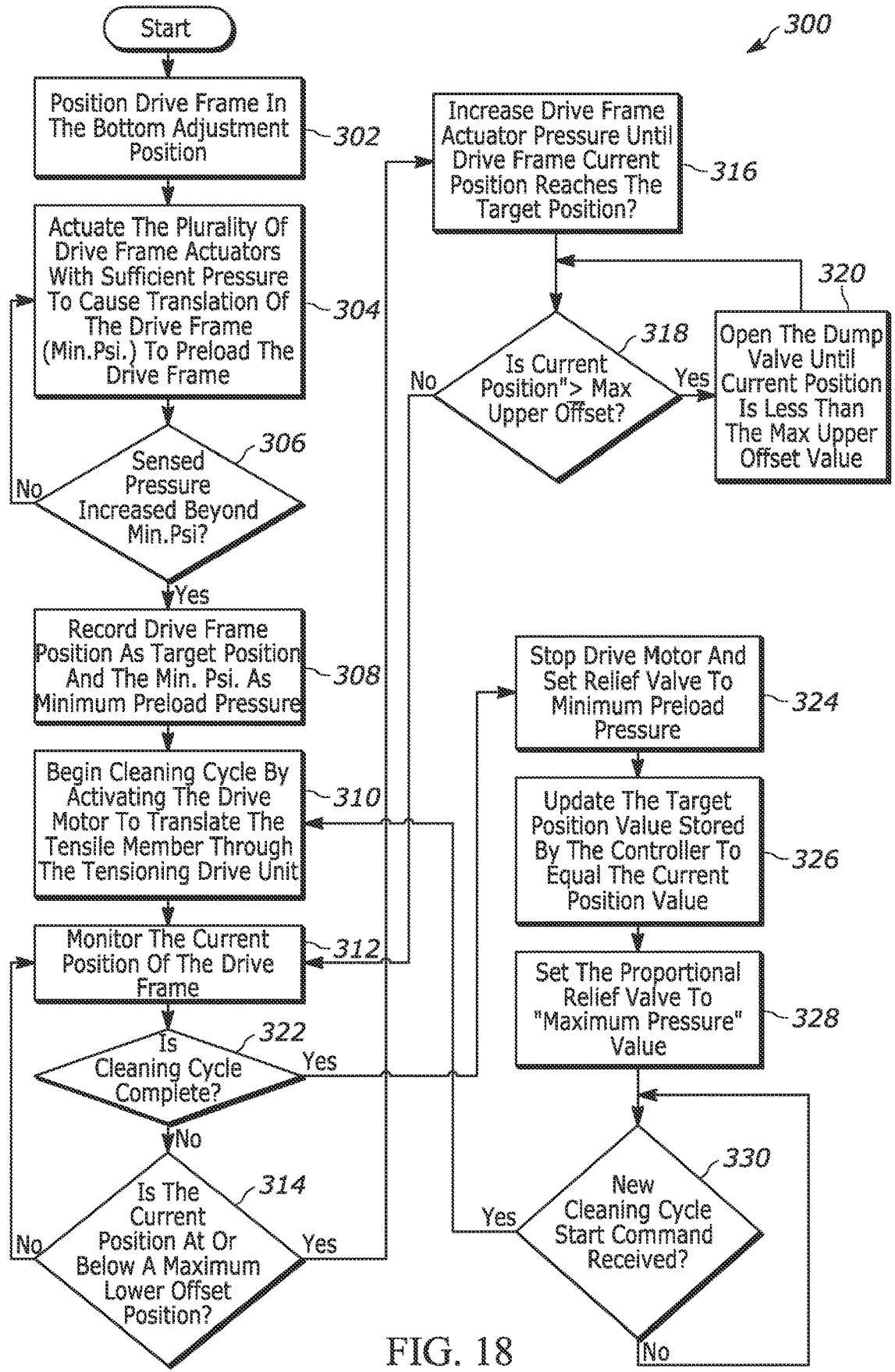
FIG. 18 is a flow chart 300 illustrating an exemplary method of using the automatic tensioning apparatus.

Referring to FIG. 18, a flow chart 300 is provided illustrating an exemplary method of using the automatic tensioning apparatus 116 to automatically tension the tensile member 110 in the floor cleaning system 100 having the circuit 111 that includes one or more scrapers 108 coupled to the tensile member 110. The method/process begins at step 302, with the drive frame 150 in the bottom adjustment position 206 (at the lowest available point ((zero point)) on the base frame axis 172). In this position, tensile member 110 has extra slack in the circuit 111. At step 304, the plurality of drive frame actuators 174 are actuated to begin moving the drive frame 150 along the base frame axis 172 and towards the top adjustment position 204 to place the tensile member 110 under minimum tension at a height value greater than zero along the base frame axis 172. In embodiments where the drive frame actuators 174 are hydraulically driven, the controller 122 activates the electric pump 186 to deliver hydraulic fluid from reservoir 188 to the drive frame actuators 174. Fluid enters the hydraulic cylinders 175 of the drive frame actuators 174 filling the void volume; once the void volume within the cylinders are filled pressure begins to build in the hydraulic system 182 until a minimum pressure is provided sufficient enough to begin translating the drive frame 150 along the base frame axis 172. This change in position of the drive frame 150 along the base frame axis 172 is monitored by the sensor 208. The drive frame 150 will continue to raise at this same minimum pressure until the slack in the tensile member 110 is taken up. Once the slack in tensile member 110 is removed, drive frame actuator pressure will begin to increase as measured by pressure transducer 194, as queried at step 306. At this point when drive frame actuator pressure begins to rise, it is understood that the system is now adding unwanted and unneeded preload force.

At step 308, once pressure is sensed as increasing past the minimum pressure (noting an acceptable tolerance), the controller 122 records the current position (i.e., current height value) of the drive frame 150 along the base frame axis 172 and logs it as the "target position" (i.e., target height value) for drive frame 150 for the next cycle. It also records the applied minimum pressure and saves it as "minimum preload pressure."

At step 310, a cleaning/scraping cycle begins by activating the drive motor 156 to begin translating the tensile member 110 through the tensioning drive unit 120. The cleaning cycle is configured to move the cleaning devices for a set period of time, although various other or additional criteria could be used to determine the duration of the cleaning cycle. As debris is collected on the scrapers 108 passing along the floor 104, the tension on the tensile member 110 increases due to the added debris load. This creates a downward force 210 on the drive frame 150. This force will soon overcome the "minimum preload pressure" provided by the drive frame actuators 174 that was taking-up the excess slack in the tensile member 110 prior to the system starting the cleaning cycle. At this point, the drive frame 150 "current position" will begin to move lower (i.e., reduced height value) as identified by the sensor 208. The controller 122 monitors the "current position" of the drive frame 150 as indicated in step 312 and will allow the "current position" to continue moving down the base frame axis 172 from the "target position" to a user defined position on the base frame axis 172 called the "maximum lower offset." This "maximum lower offset" value is indicative of the amount of additional slack in the tensile member 110 that is deemed acceptable without causing mechanical problems, such as balling of the chain or rope on the slack side.

At step 314 the current position is compared with the "maximum lower offset," if the "current position" (i.e., current high value) of the drive frame 150 is positioned on the base frame axis 172 at or below the "maximum lower offset," then at step 316, the controller 122 commands increased pressure to the drive frame actuators 174 by activating the electric pump 186 to increase system pressure to move the drive frame 150 to an increased height value. Pressure to the drive frame actuators 174 will continue to be increased until the drive frame 150 "current position" equals or is greater than the "target position." At this point, the pressure in the hydraulic system 182 will have increased. To account for excessive overshoot of "target position," the controller 122 can include a provision for a user settable "maximum upper offset." The "maximum upper offset" being the acceptable overshoot the drive frame 150 moves above the "target position" along the base frame axis 172 before the controller 122 will open the dump valve 190 to bleed off pressure to the drive frame actuators 174 resultingly lowering the "current position" of the drive frame 150, as seen in steps 318 and 320. Thus, the "maximum upper offset" and "maximum lower offset" provide configurable dead-bands to inhibit the controller 122 from constantly running the electric pump 186 and then opening the dump valve 190. In at least some embodiments, in addition to monitoring position of the drive frame 150 (i.e., the height value), a proportional relief valve 192 can be set to an allowable "maximum pressure" for the safety of mechanical components in the event of the electric pump 186 does not shut off. The aforementioned process continues until the until the end of the cleaning cycle is detected at step 322, which can be a pre-programmed instruction based on time, scraper repetitions, user input, etc., further noting that the status of the cleaning cycle (i.e., complete or not complete) can be continuously monitored along in combination with the current position of the drive frame and the maximum lower offset position.

When the cleaning cycle ends, the process advances to step 324 where the controller 122 stops the drive motor 156 and sets the proportional relief valve 192 to the "minimum preload pressure." The pressure on the drive frame actuators will then drop to the "minimum preload pressure." When this occurs, "current position" of the drive frame 150 will drop to a new updated "target position" that is recorded by the controller 122 in step 326. Over time, as the cleaning process is repeated, the "target position" value will continue to slowly increase as the tensile member 110 wears/stretches, hence automatically compensating for chain/rope stretch and wear without user intervention. With the new updated "target position" set, the controller 122 in at least some embodiments, resets the proportional relief valve 192 back to a "maximum pressure" value at step 328, and then waits at step 330 for a new cleaning cycle start command from the controller 122. The aforementioned process can be performed in various other ways including more or less steps and in varying order.

Although the automatic tensioning apparatus 116 has been described utilizing drive frame position (i.e., height value) as a feedback mechanism to indicate the tension on the tensile member 110, various other mechanisms can be utilized as discussed below. For example, a loadcell can be provided in-line with the tensile member 110, or on the shaft securing the tensile member interface 158, or on any of the roller guides 112, or the axial wheel mounts 180, to measure tension in the tensile member 110 and equate the sensed load value to the required pressure in the hydraulic cylinders of the drive frame actuators 174 to provide an equal and opposite upward force. Another example includes utilizing the amperage load on the drive motor 156 to calculate the theoretical tension in the tensile member 110. This entails recording the minimum percent of output torque required with no load on the circuit 111, the downward force 210 can be equated to a required pressure within the hydraulic cylinders of the drive frame actuators 174 so as to equal the downward force 210 caused by the tensile member 110, hence providing the necessary tension to drive the load. The output torque can be calculated using the measured or known amperage and voltage drawn by the motor as well as the rotational speed of the motor shaft (measured by the rotation of the encoder wheel 168, for example). The feedback loop would then constantly adjust pressure based on the percent of output torque.

Yet another example includes using pressure feedback from the cylinders of the drive frame actuators 174. Using pressure differential between a rod-side and cap-side of a cylinder piston in the drive frame actuator 174, it is possible to control the system to provide the correct amount of tension. At no load, the controller 122 would pressurize the cylinder such that the force on both the rod-side of the piston and the cap-side of the piston is equal to zero by equation: [(Pressure on Cap-Side)×(Area of Cap-Side Piston)−(Pressure on Rod-Side)×(Area of Rod-Side Piston)=Force on Piston]. When the tensile member 110 sees a load, it will induce a delta pressure which is measured by pressure transducers on both sides of the cylinder. The controller 122 would either add or remove pressure from the load bearing side of the cylinder to bring the system back to a zero state. The dead-band would be the allowable differential in pressure between the cap-side and rod-side of the cylinder.

In addition to the disclosed shapes and sizes, the aforementioned components, can vary to include numerous adaptations. Further, the material composition of all components can also include numerous elements, such as steel, aluminum, alloys, plastics, etc. The use of the term "plurality" in the description or claims shall be understood to include "one or more," and the terms "bottom", "top", "upper" and "lower" shall not be considered limiting in that they are used for convenience when referencing a vertical orientation of the invention, while other orientations of the invention have been contemplated.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A method of use for an automatic tensioning apparatus comprising:
positioning a drive frame and drive assembly, movably coupled to a longitudinally extending stationary base frame, in a bottom adjustment position along the base frame using a plurality of drive frame actuators coupled to the drive frame and base frame, wherein a tensile member is rotationally engaged with the drive assembly to provide translation of the tensile member;

actuating the plurality of drive frame actuators to cause vertical translation of the drive frame to remove slack in the tensile member, wherein the tensile member forms part of a continuous circuit engaging a plurality of movable cleaning devices;

storing as a minimum pressure, a first sensed pressure exerted to extend the plurality of drive frame actuators to remove the slack;

continue actuating the plurality of drive frame actuators until a second sensed pressure exerted to extend the plurality of drive frame actuators has exceeded the minimum pressure, storing a first detected current position of the drive frame relative to the base frame as a target position value, and the minimum pressure as a minimum preload pressure;

activating a cleaning cycle that includes rotating a drive motor of the drive assembly in a first rotational direction to move the plurality of movable cleaning devices in a first longitudinal direction;

monitoring and comparing a second detected current position of the drive frame with the target position value, if the second detected current position is at or below a pre-defined maximum lower offset position measured from the target position value, then actuating the plurality of drive frame actuators to move the drive frame up to or above the target position value, wherein the maximum lower offset position is indicative of an amount of additional slack in the tensile member; and detecting completion of the cleaning cycle and updating the target position value that is stored to be equal to a third detected current position of the drive frame.

2. The method of claim 1, further including a controller for storing activatable cleaning cycle instructions, the first detected current position, the target position value, and the maximum lower offset position, and for providing an actuating signal to the plurality of drive frame actuators and a directional rotation signal to the drive motor.

3. The method of claim 2, wherein the cleaning cycle further includes rotating the drive motor in a second rotational direction to move the plurality of movable cleaning devices in a second longitudinal direction.

4. The method of claim 3, wherein the target position value that is stored is updated after each subsequent cleaning cycle has completed.

5. The method of claim 4, further comprising a hydraulic system for actuating the drive frame actuators.

6. The method of claim 5, further including stopping the drive motor and setting a pressure relief valve in the hydraulic system to the minimum preload pressure upon sensing completion of the cleaning cycle, wherein the pressure relief valve is in fluid communication with the plurality of drive frame actuators.

* * * * *